(12) United States Patent
Monchiero et al.

(10) Patent No.: US 8,122,125 B2
(45) Date of Patent: Feb. 21, 2012

(54) DEEP PACKET INSPECTION (DPI) USING A DPI CORE

(75) Inventors: Matteo Monchiero, Palo Alto, CA (US); Jayaram Mudigonda, San Jose, CA (US); Yoshio Turner, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 12/555,552

(22) Filed: Sep. 8, 2009

(65) Prior Publication Data
US 2011/0060851 A1    Mar. 10, 2011

(51) Int. Cl.
*G06F 15/173* (2006.01)
*G06F 3/00* (2006.01)
*G06F 11/00* (2006.01)

(52) U.S. Cl. ............... 709/224; 709/223; 710/5; 710/22; 726/22; 726/23

(58) Field of Classification Search .................. 709/201, 709/202, 223, 224, 227, 229, 230, 232, 236, 709/246, 247; 710/1, 5, 7, 15, 18, 20, 22, 710/52; 726/1, 2, 11, 13, 22–25
See application file for complete search history.

(56) References Cited

U.S. PATENT DOCUMENTS

| | | | |
|---|---|---|---|
| 2006/0156399 A1* | 7/2006 | Parmar et al. | 726/22 |
| 2008/0016313 A1* | 1/2008 | Murotake et al. | 711/173 |
| 2009/0013407 A1* | 1/2009 | Doctor et al. | 726/23 |
| 2009/0073981 A1* | 3/2009 | Coyte et al. | 370/392 |

* cited by examiner

*Primary Examiner* — Richard B Franklin
(74) *Attorney, Agent, or Firm* — Theodore C. McCullough

(57) ABSTRACT

Illustrated is a system for performing Deep Packet Inspection (DPI) that includes a core to prepare a data packet for transmission. Further, the system includes a memory controller to direct the data packet to a DPI core. Additionally, the system includes a Network Interface Card to receive the data packet for transmission after DPI is performed on the data packet by the DPI core. The system includes a Direct Memory Management module to update a descriptor that references a received data packet stored in an Operating System buffer. Moreover, the system includes an Input/Output Memory Management Unit to direct the descriptor to be stored in a DPI memory. Additionally, the system includes an interrupt controller to transmit an interrupt to the DPI core to such that the DPI core retrieves the descriptor from the DPI memory and performs DPI on the data packet stored in the OS buffer.

17 Claims, 16 Drawing Sheets

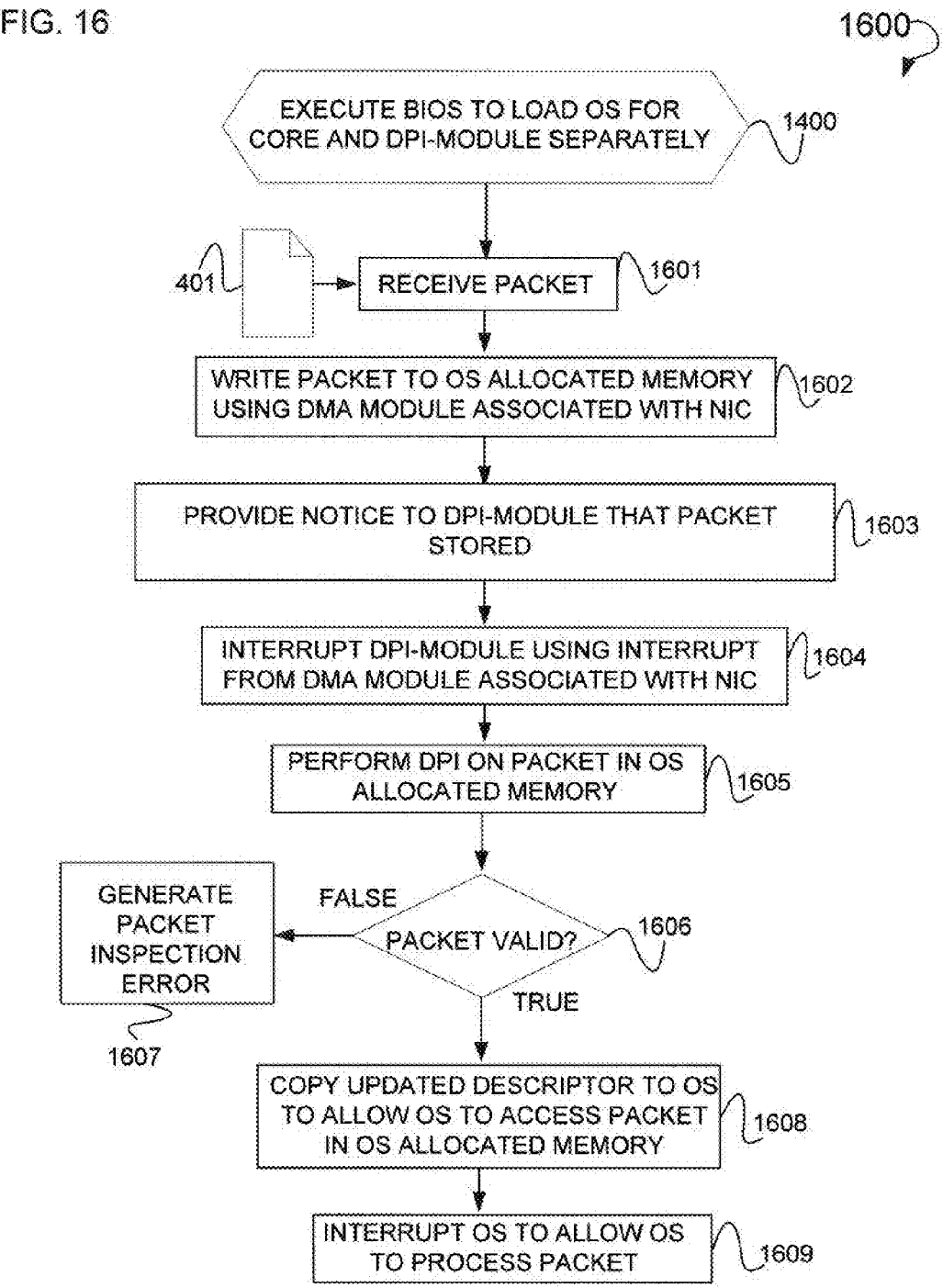

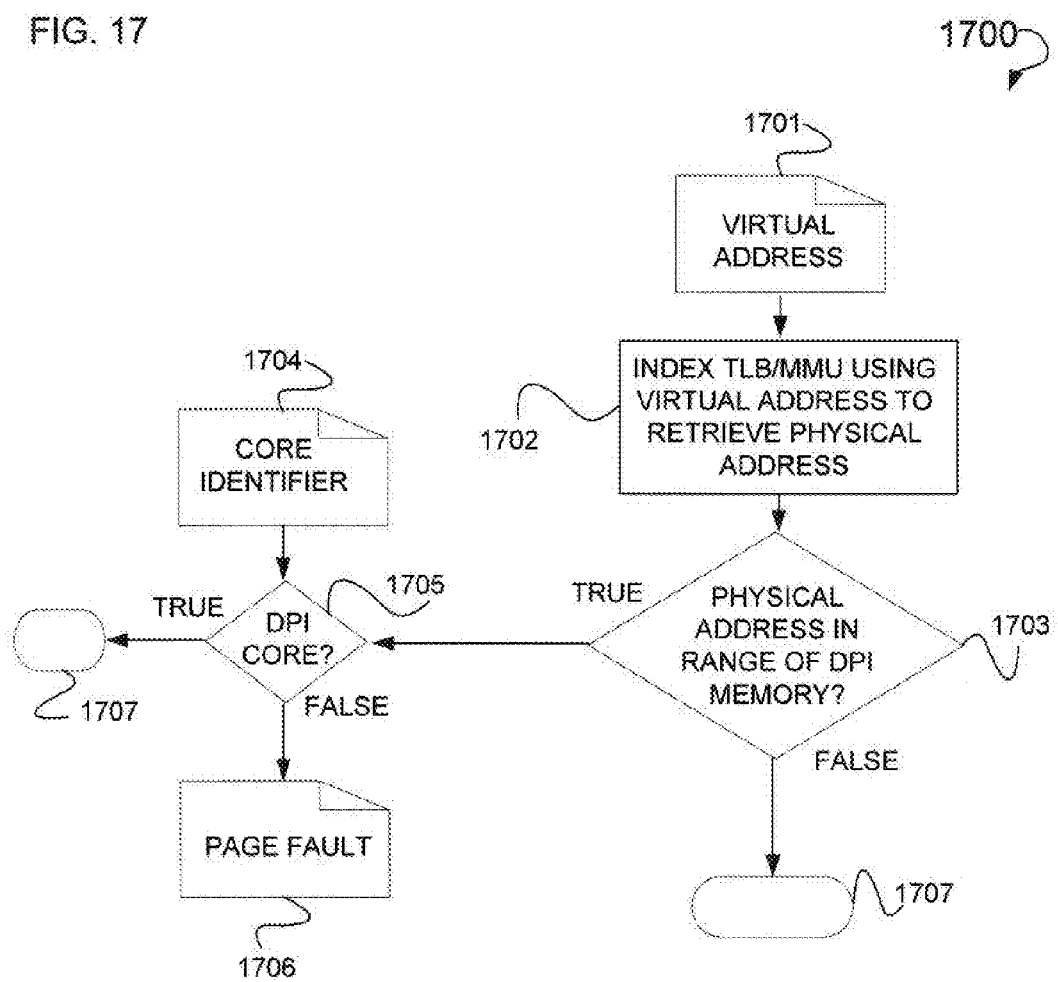

DEEP PACKET INSPECTION (DPI) USING A DPI CORE

BACKGROUND

Deep Packet Inspection (DPI) is used to, for example, ensure Quality of Service (QoS) for certain packet types, to meet network traffic and bandwidth requirements, to detect malware, or enforce business conduct policies on information exchanged inside and outside a company. DPI is presently used in data centers and other places where large amounts of data are processed. Through DPI, network security and efficiency can be maintained.

BRIEF DESCRIPTION OF THE DRAWINGS

Some embodiments of the invention are described, by way of example, with respect to the following figures:

FIG. 16 is a flowchart illustrating a method, according to an example embodiment, used to receive a data packet and to perform DPI on the data packet.

FIG. 17 is a flowchart illustrating a method, according to an example embodiment, used to denote a page fault error in accessing DPI memory.

DETAILED DESCRIPTION

Illustrated is a system and method for DPI that uses a DPI-module residing on a DPI-core to perform DPI. In some example embodiments, this DPI-core resides upon the same computer system as a general purpose core (e.g., the core) and associated Operating System (OS). When receiving a data packet, a NIC associated with the core copies, using DMA, the data packet to a packet buffer in residing in the computer system's main memory. An updated descriptor from the NIC is directed by the Input/Output Memory Management Unit (I/O MMU) to the DPI-module. At some later point, the interrupt controller sends an interrupt to the DPI-module instructing the DPI-module to perform DPI on the received packet. When a data packet is to be transmitted, the OS is instructed, by a memory controller associated with the core, to write the data packet to a DPI buffer. This instruction is provided via a DMA module associated with the memory controller. At some later point, the interrupt controller sends an interrupt to the DPI-module instructing the DPI-module to perform DPI on the packet to be transmitted. Further, as will be more fully illustrated below, the core's I/O MMU, interrupt controller, memory controller, and Translation Look Aside Buffer (TLB) are modified so that the DPI memory can only be accessed by the DPI-module.

In some example embodiments, the DPI-module is statically mapped on a specific DPI-core at boot time. This can be implemented at boot time by the computer system's BIOS, which effectively hides the DPI-core from the general purpose core(s) available to the OS, and bootstraps the DPI environment onto the DPI-core. With respect to memory allocation on the computer system, the DPI-module's virtual address space is mapped to a statically assigned portion of the computer system's main memory. This portion of memory is reserved as DPI memory. While the DPI-module is able to access all memory on the computer system including memory allocated for the OS, the OS and core(s) upon which it resides cannot access the DPI memory.

Figure 1:
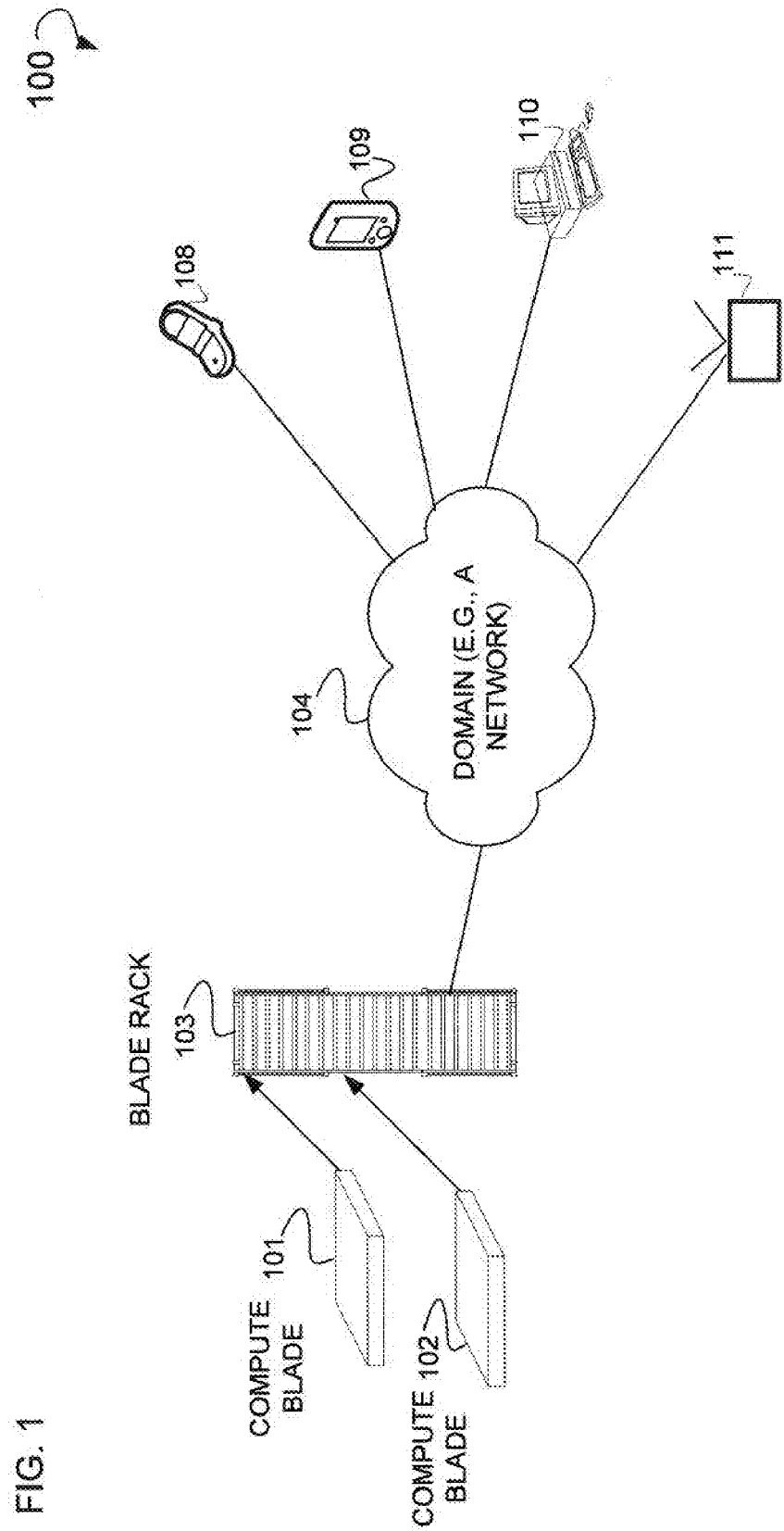
FIG. 1 is a diagram of a system, according to an example embodiment, illustrating a computer system in the form of a plurality of compute blades that utilizes a DPI-module.

FIG. 1 is a diagram of an example system 100 illustrating a computer system in the form of a plurality of compute blades that utilizes a DPI-module. Shown are a compute blade 101, and a compute blade 102. Each of the compute blades are positioned proximate to a blade rack 106. The compute blades 101-102 are operatively connected to the network 107. Operatively connected includes a logical or physical connection. The network 107 may be an internet, an intranet, a Wide Area Network (WAN), a Local Area Network (LAN), or some other network and suitable topology associated with the network. In some example embodiments, operatively connected to the network 107 is a plurality of devices including a cell phone 106, a Personal Digital Assistant (PDA) 107, a computer system 108 and a television or monitor 109. In some example embodiments, the compute blades 101-102 communicate with the plurality of devices via the network 107.

Figure 2:
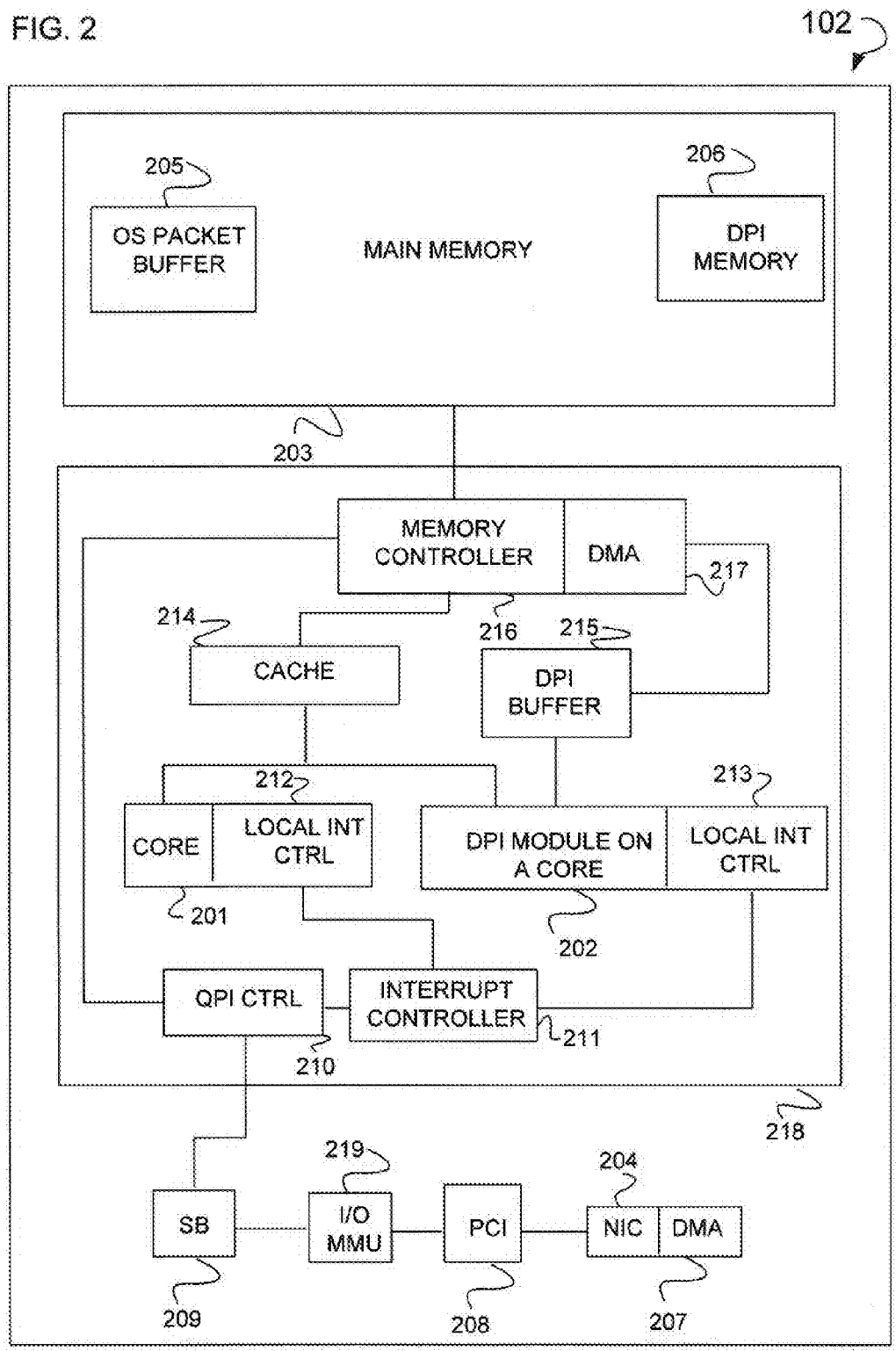
FIG. 2 is a diagram of a compute blade, according to an example embodiment, illustrating architecture for DPI.

FIG. 2 is a diagram of an example compute blade 102 illustrating architecture for DPI. Shown are a core 201, and a DPI-core 202 that is isolated and distinct from the core 201. Associated with the core 201 is a local interrupt controller 212. Further, associated with the DPI-core 202 is a local interrupt controller 213. The core 201 and DPI-core 202 residing within the same form factor 218. Also, illustrated are a NIC 204 and an associated DMA module 207. This NIC 204 is operatively connected to a Peripheral Component Interconnect (PCI) module 208. Further, PCI module 208 is operatively connected to an I/O MMU 219. The I/O MMU is operatively connected to a South Bridge (SB) 209. The SB 209 is operatively connected to a Quick Path Interconnect (QPI) controller 210 that is, in turn, operatively connected to an interrupt controller 211. The interrupt controller 211 is operatively connected to the core 201 and the DPI-core 202. Further, QPI controller 210 is operatively connected to a memory controller 216. Associated with the memory controller 216 is a DMA module 217. Further, illustrated is a cache 214 that is operatively connected to the memory controller 216, the core 201, and the DPI-core 202. Additionally, an optional DPI buffer 215 is shown that is operatively connected to the DMA module 217 and the DPI-core 202. Also, shown is a main memory 203 that includes an OS packet buffer 205 and a DPI memory 206. This main memory may be persistent or non-persistent memory.

In some example embodiments, interfaces are associated with each of the I/O MMU 219, interrupt controller 211, and memory controller 216 are made available only to the DPI-module to allow the DPI-module to modify the functionality of the I/O MMU 219, interrupt controller 211, and memory controller 216. These interfaces may be physical interfaces or Application Programming Interfaces (APIs). Example modified functionality includes the I/O MMU 219 directing updated descriptors to a DPI-module residing on the DPI-core 202 from the NIC 204, the interrupt controller 211 interrupting the DPI-module to perform DPI, and the memory controller 216 writing a data packet to be transmitted to a DPI buffer (e.g., DPI memory 206) from an OS packet buffer 205.

Figure 3:
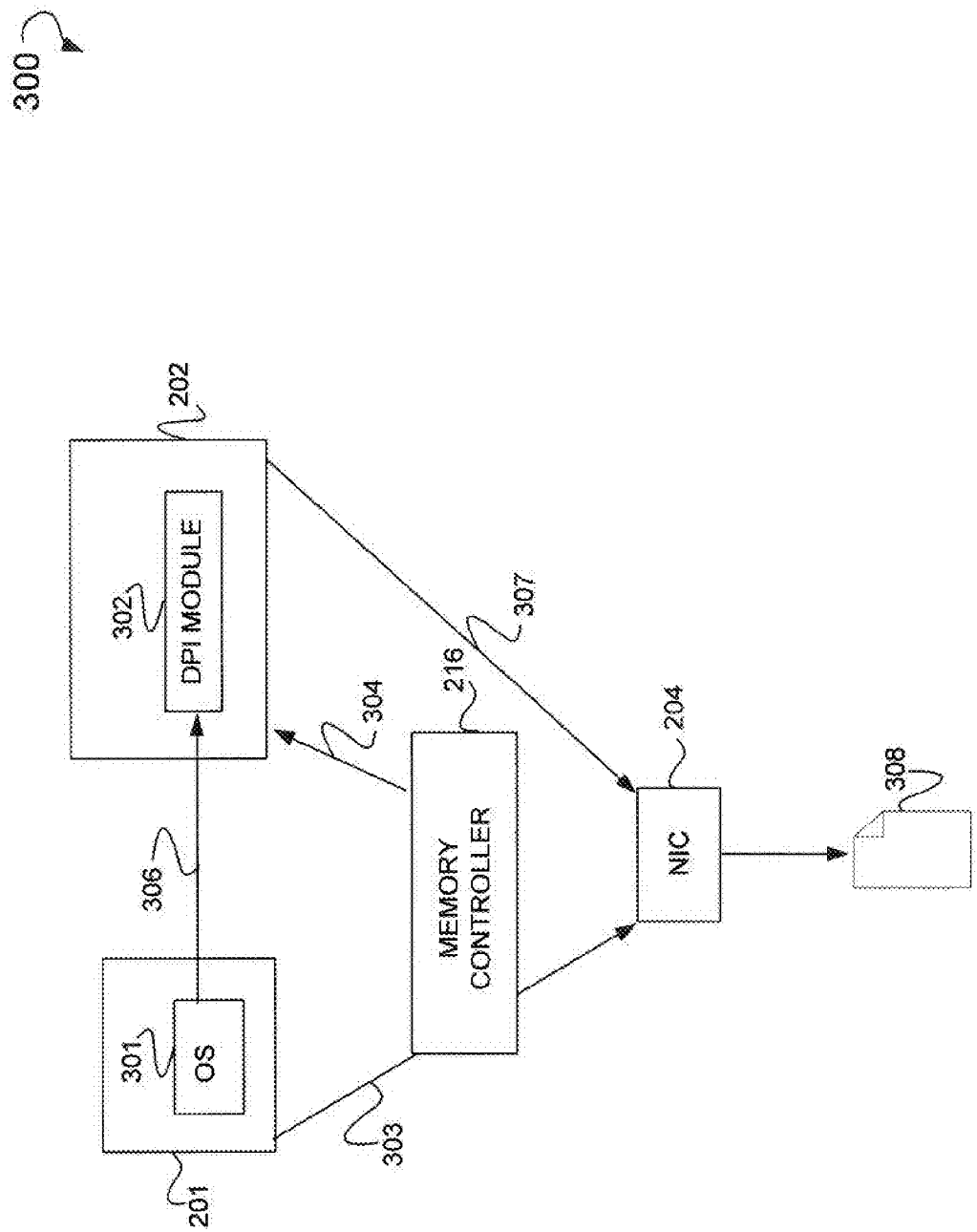
FIG. 3 is a sequence diagram illustrating various execution sequences, according to an example embodiment, for a compute blade that transmit a data packet upon which DPI has been performed.

FIG. 3 is a sequence diagram illustrating various example execution sequences for a compute blade 300 that is transmitting a data packet upon which DPI has been performed. The compute blade 300 is an example of the compute blade 102. Shown is an OS 301 residing on the core 201, and a DPI-module 302 residing on the DPI-core 202. The OS 301 may be some type of suitable OS including the LINUX™ operating system, Microsoft Corporation's WINDOWS™ operating system, Sun Corporation's SOLARIS™ operating system, the UNIX™ operating system, or some other suitable operating system known in the art. Additionally, the DPI-module 302 may be one of these operating systems. In one example embodiment, an OS 301 residing on the core 201 transmits a descriptor (e.g., a pointer or referent to an address in an OS buffer that denotes the starting point and size of the OS buffer) to a device register residing on the NIC 204. This transmission is referenced at 303. The memory controller 216 directs this write descriptor to the DPI-module 302. This direction is referenced at 304. The interrupt controller 211 (not pictured) notifies the DPI-module 302 that a packet is in need of inspection via using an interrupt or by writing a memory mapped register. This notification is referenced at 305. Upon notification, the DPI-module 302 can use the descriptor provided to it by the memory controller 216 to perform DPI on the data packet. In some example embodiments, the DPI-module 302 uses a modified NIC device driver to retrieve the descriptor. This inspection process is denoted at 306. Where the DPI is successful and the packet validated for transmission by the DPI-module 302, a signal is sent to the NIC 204 to transmit the data packet 308. This signal is denoted at 307. In some example embodiments, the DPI and the sending of the data pack to the NIC occur synchronously with the operations of the NIC 204 and OS 301.

Figure 4:
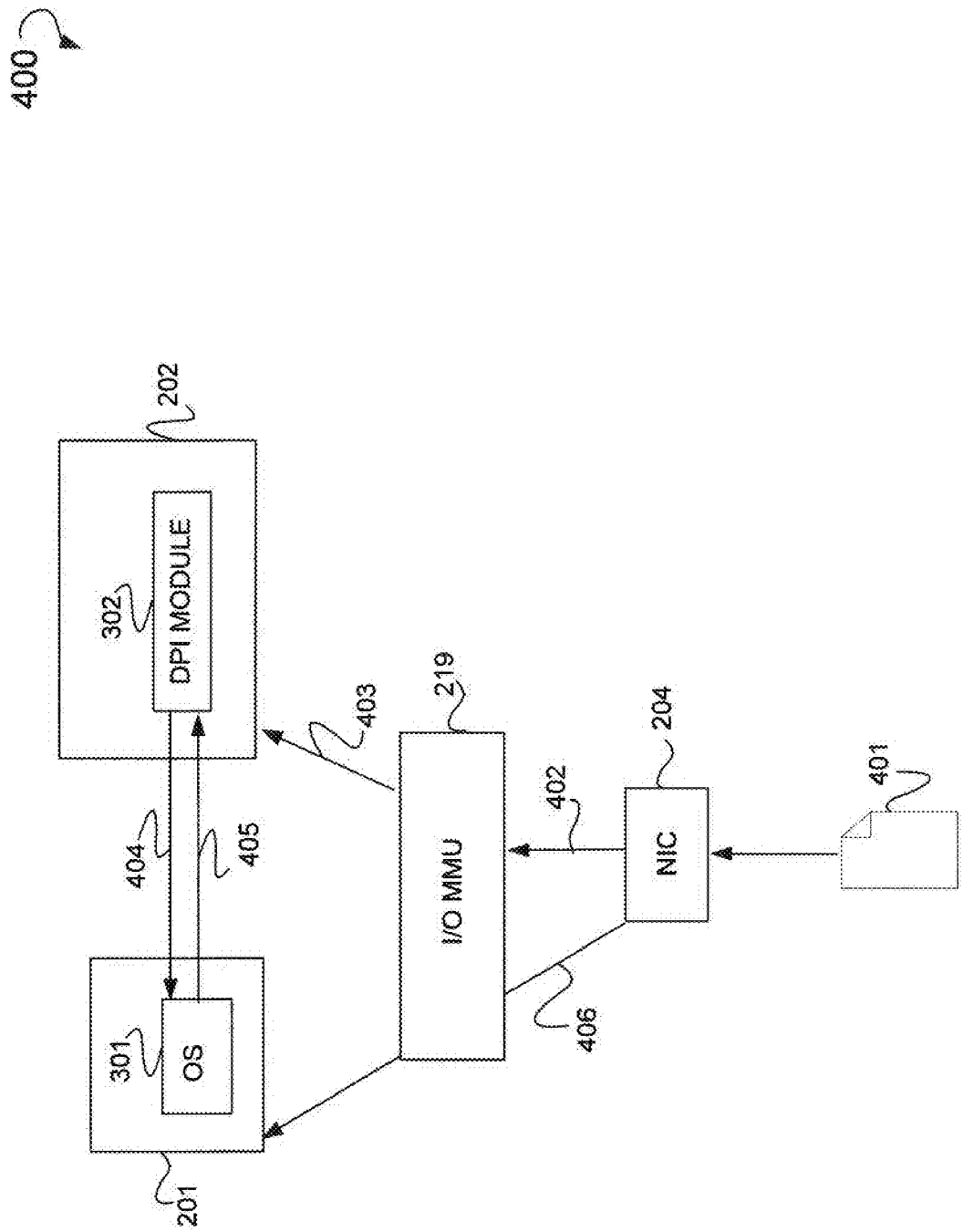
FIG. 4 is a sequence diagram illustrating various execution sequences, according to an example embodiment, for a compute blade that is receiving a data packet upon which DPI is to be performed.

FIG. 4 is a sequence diagram illustrating various example execution sequences for a compute blade 400 that is receiving a data packet upon which DPI is to be performed. The compute blade 400 is an example of the compute blade 102. Shown is a data packet 401 that is received by the NIC 204. The DMA module 207 associated with the NIC 204 stores the data packet 401 into the OS packet buffer 205. This storage of the data packet 401 is referenced at 406. Further, an updated descriptor referencing the location of the stored data packet 401 is transmitted by the NIC 204 to the I/O MMU 219 is referenced at 402. As used herein, an update descriptor denotes a pointer or referent to an address in an OS buffer and a size of the OS buffer in which is stored a data packet. In some example embodiments, the update descriptor describes the particular location of the data packet in the OS buffer. The I/O MMU 219 detects the updated descriptor and directs it to the DPI-module 302 as denoted at 403. This updated descriptor may be stored in the DPI memory 206 or DPI buffer 215. An interrupt is generated by the interrupt controller 211 (not pictured) to allow the DPI-module 302 to perform DPI on the data packet 401. Where the data packet 401 is valid, the updated descriptor is sent by the DPI-module 302 to the OS 301 requesting that the data packet 401 be processed. DPI is denoted at 405, and the updated descriptor being sent to the OS 301 is denoted at 404. In some example embodiments, the interrupt may be an extra inter-processor interrupt. As with the sending of the data packet, the receiving of the data packet may occur synchronously with the operations of the NIC 204 and OS 301.

Figure 5:
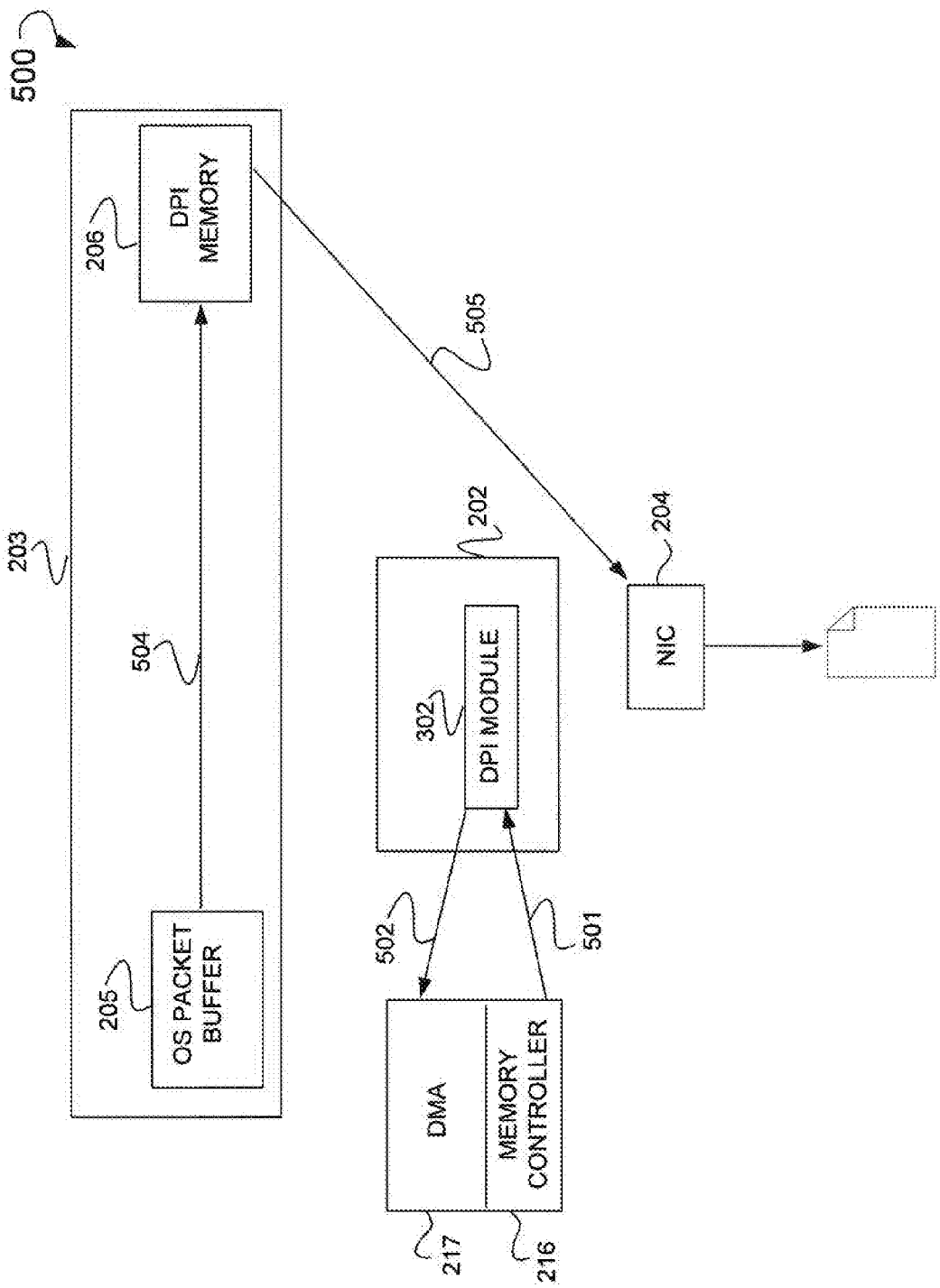
FIG. 5 is a sequence diagram illustrating various main memory to main memory based execution sequences, according to an example embodiment, for a compute blade that is transmitting a data packet upon which DPI is to be performed.

FIG. 5 is a sequence diagram illustrating various example main memory to main memory based execution sequences for a compute blade 500 that is transmitting a data packet upon which DPI is to be performed. The compute blade 500 is an example of the compute blade 102. As shown, the memory controller 217 that provides a descriptor to the DPI-module 302 as denoted at 501. The descriptor is used to access the data packet in the OS packet buffer 205 that is to be transmitted. As denoted at 504, the DPI-module 302 accesses the DMA module 217 and instructs the DMA module 217 to move the data packet from the OS packet buffer 205 to the DPI memory 206. In some example embodiments, the DPI memory 206 is a DPI buffer that resides upon the form factor 218. Further, as denoted at 505, where the data packet is validated via DPI, the DPI-module 302 provides notice to the NIC 204 that the data packet is ready for transmission.

Figure 6:
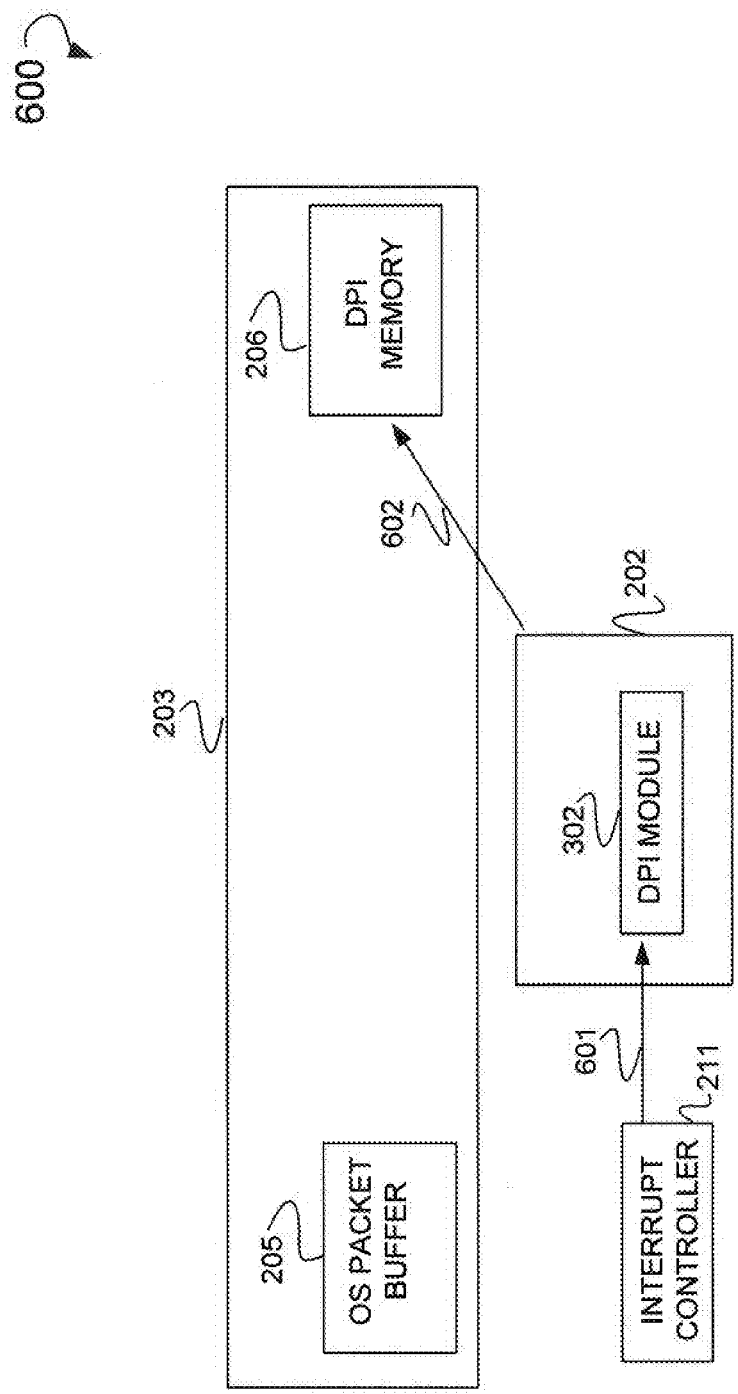
FIG. 6 is a sequence diagram illustrating the use of an interrupt controller, according to an example embodiment, in conjunction with a DPI-module on a compute blade.

FIG. 6 is a sequence diagram illustrating the use of an interrupt controller in conjunction with the DPI-module 302 on a compute blade 600. An example of the compute blade 600 is the compute blade 102. As illustrated at 601, an interrupt is sent by the interrupt controller 211 to the DPI-module 302 that interrupts the DPI-module 302 such that DPI can be performed. To perform DPI, the DPI-module 302 retrieves an updated descriptor from the DPI memory 206 at denoted at 602. Where the data packet is determined to be valid, the OS 301 is provided the updated descriptor (see FIG. 4).

Figure 7:
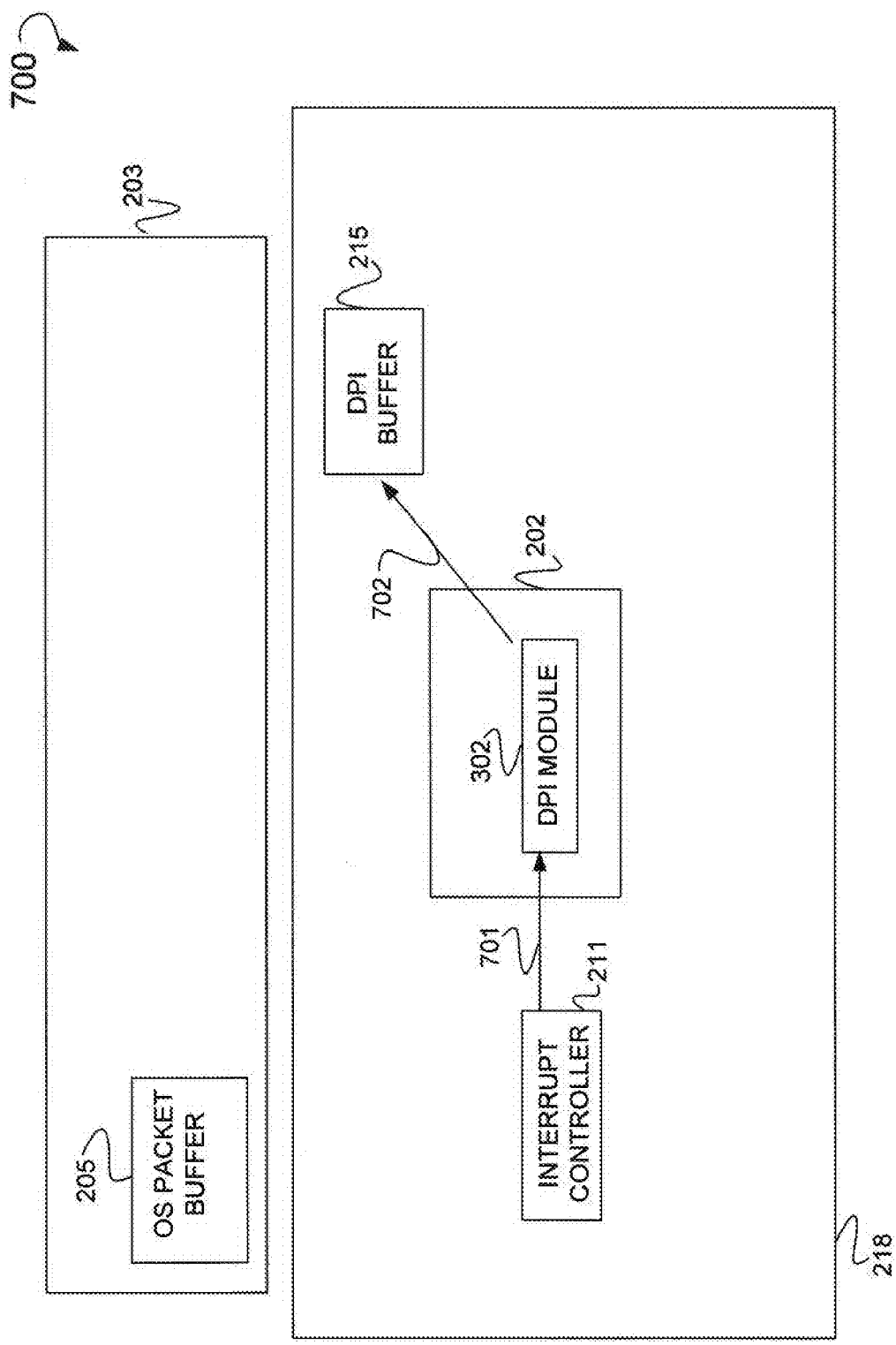
FIG. 7 is a sequence diagram illustrating the use of an interrupt controller, according to an example embodiment, in conjunction with the DPI buffer on a compute blade.

FIG. 7 is a sequence diagram illustrating the use of an interrupt controller in conjunction with the DPI buffer on a compute blade 700. An example of the compute blade 700 is the compute blade 102. As illustrated at 701, an interrupt is sent by the interrupt controller 211 to the DPI-module 302 that interrupts the DPI-module 302 such that DPI can be performed. To perform DPI, the DPI-module 302 retrieves an updated descriptor from the DPI buffer 215 at denoted at 602. Where the data packet is determined to be valid, the OS 301 is provided the updated descriptor (see FIG. 4).

Figure 8:
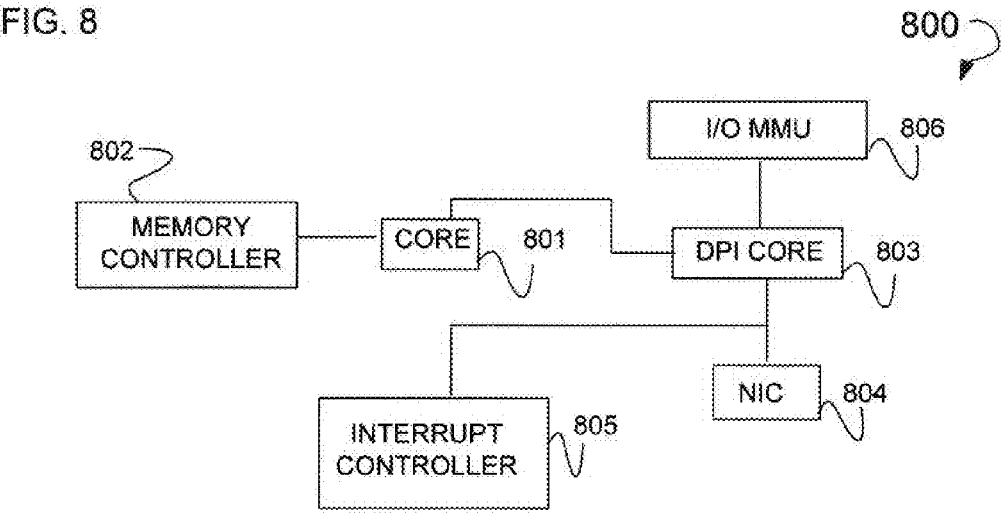
FIG. 8 is a block diagram of a computer system, according to an example embodiment, in the form of the compute blade used to perform DPI on a data packet to be transmitted.

FIG. 8 is a block diagram of an example computer system 800 in the form of the compute blade 102 used to perform DPI on a data packet to be transmitted. These various blocks may be implemented in hardware, firmware, or software as part of the computer blade 101, or computer blade 102. Further, these various blocks are logically or physically connected. Illustrated is a core 801 to prepare a data packet for transmission. Operatively connected to the core 801 is a memory controller 802 to direct the data packet to a DPI core 803. Operatively connected to the DPI core 803 is a NIC 804 to receive the data packet for transmission after DPI is performed on the data packet by the DPI core 803. In some example embodiments, the memory controller 802 includes an interface only accessible by the DPI core 803. Operatively connected to the DPI core 803 is an interrupt controller 805 to signal the DPI core 803 to perform the DPI on the data packet. In some example embodiments, the interrupt controller includes an interface only accessible by the DPI core 803. Operatively connected to the DPI core 803 is an I/O MMU 806 to direct an updated descriptor to the DPI core 803, the updated descriptor to be stored in a DPI memory.

Figure 9:
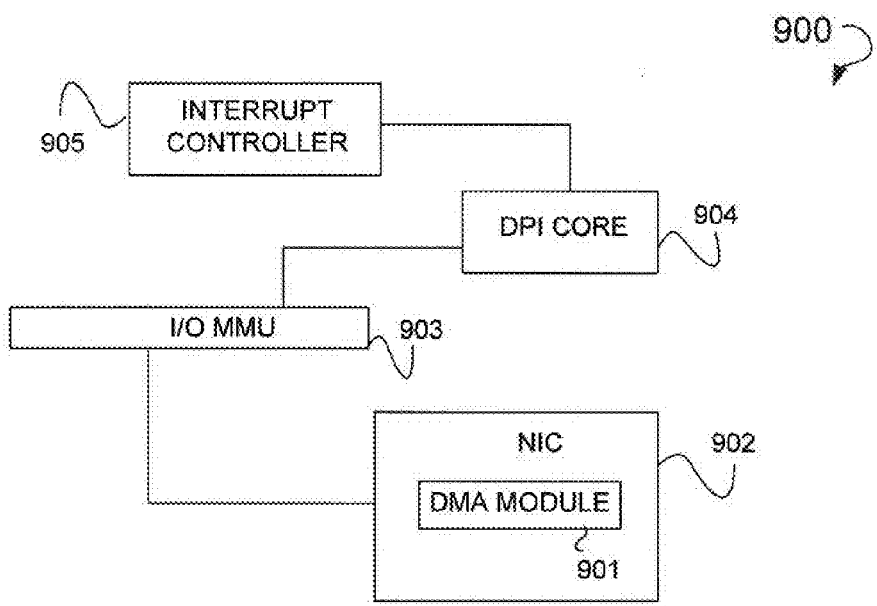
FIG. 9 is a block diagram of a computer system, according to an example embodiment, in the form of the compute blade used to receive and perform DPI on a data packet.

FIG. 9 is a block diagram of an example computer system 900 in the form of the compute blade 102 used to receive and perform DPI on a data packet. These various blocks may be implemented in hardware, firmware, or software as part of the computer blade 101, or computer blade 102. Further, these various blocks are logically or physically connected. Shown is a DMA module 901, associated with a NIC 902, to update a descriptor that references a received data packet stored in an OS buffer. Operatively connected to the NIC 902 is an I/O MMU 903 to direct the descriptor to be stored in a DPI memory associated with a DPI core 904. Operatively connected to the DPI core 904 is an interrupt controller 905 to transmit an interrupt to the DPI core 904 to such that the DPI core 904 retrieves the descriptor from the DPI memory and performs DPI on the data packet stored in the OS buffer. In some example embodiments, the I/O MMU 903 includes an interface only accessible by the DPI core. In some example embodiments, the interrupt controller 905 includes an interface only accessible by the DPI core 904. Some example embodiments include the DMA module 901 to copy the data packet to OS buffer.

Figure 10:
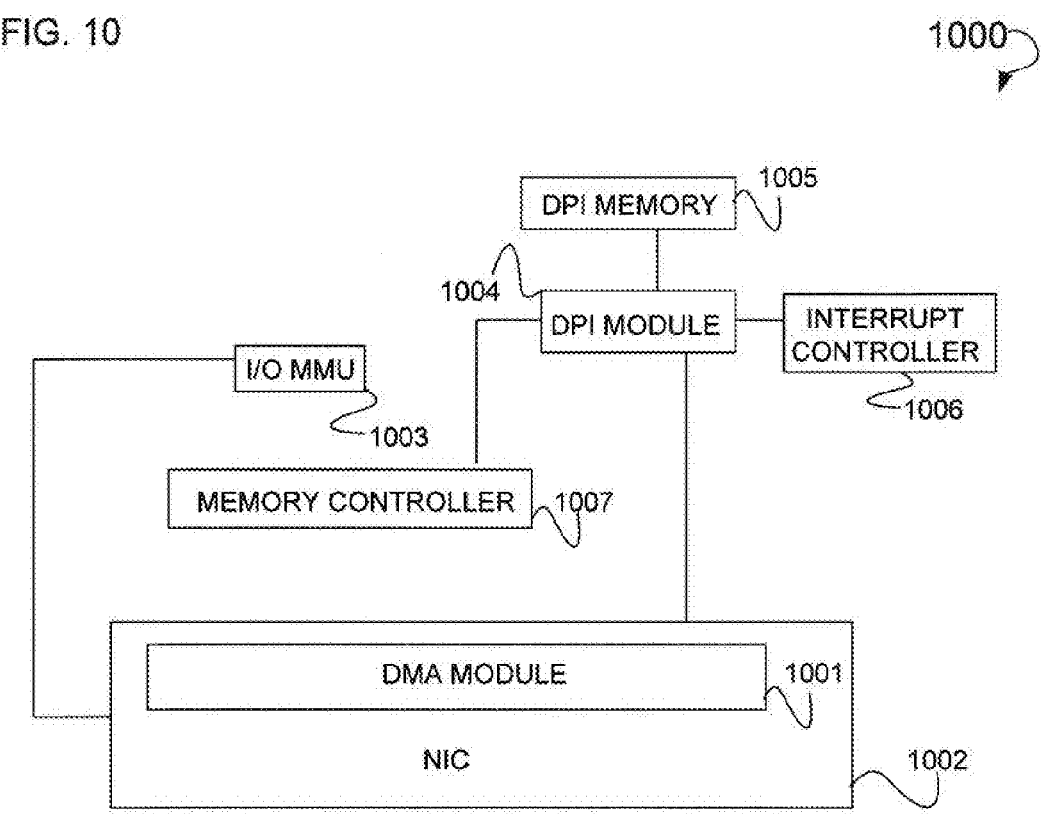
FIG. 10 is a block diagram of a computer system, according to an example embodiment, in the form of the compute blade used to perform DPI on a received data packet.

FIG. 10 is a block diagram of an example computer system 800 in the form of the compute blade 102 used to perform DPI on a received data packet. These various blocks may be implemented in hardware, firmware, or software as part of the computer blade 101, or computer blade 102. Further, these various blocks are logically or physically connected. Illustrated is a DMA module 1001 associated with a NIC 1002 to generate an updated descriptor to identify a received data packet. Operatively connected to the NIC 1002 is an I/O MMU 1003 to direct the updated descriptor to a DPI module 1004. Operatively connected to the DPI module 1004 is a DPI memory 1005 to store the updated descriptor into the DPI memory 1005 only accessible by the DPI module 1004. In some example embodiments, the DPI module 1004 is used to retrieve the updated descriptor from the DPI memory 1005 to perform DPI on the data packet, the data packet stored in an OS buffer. In some example embodiments, the updated descriptor includes a pointer to an address in the OS buffer. In some example embodiments, the DPI includes a determination of at least one of a QoS for the data packet, a network traffic and bandwidth consideration, to detect malware associated with the data packet, or to enforce business conduct policies with regard to the data packet. Operatively connected to the DPI module 1004 is an interrupt controller 1006 to facilitate the performance of DPI by the DPI module 1004 on the data packet. In some example embodiments, the performance of DPI on the data packet includes inspecting a load of the data packet. Operatively connected to the DPI module 1004 is a memory controller 1007 to receive a virtual address that identifies a location in memory. The memory controller 1007 also translates the virtual address into a physical address with a TLB associated with the memory controller 1007. The memory controller 1007 also identifies a range of the DPI memory. The memory controller 1007 also identifies a core associated with the virtual address. The memory controller 1007 further generates a page fault error, the page fault error generated where the physical address is within the range of the DPI memory and the core is associated with an OS. Additionally, the DPI module 1004 is also used to access the I/O MMU 1003 via an API.

Figure 11:
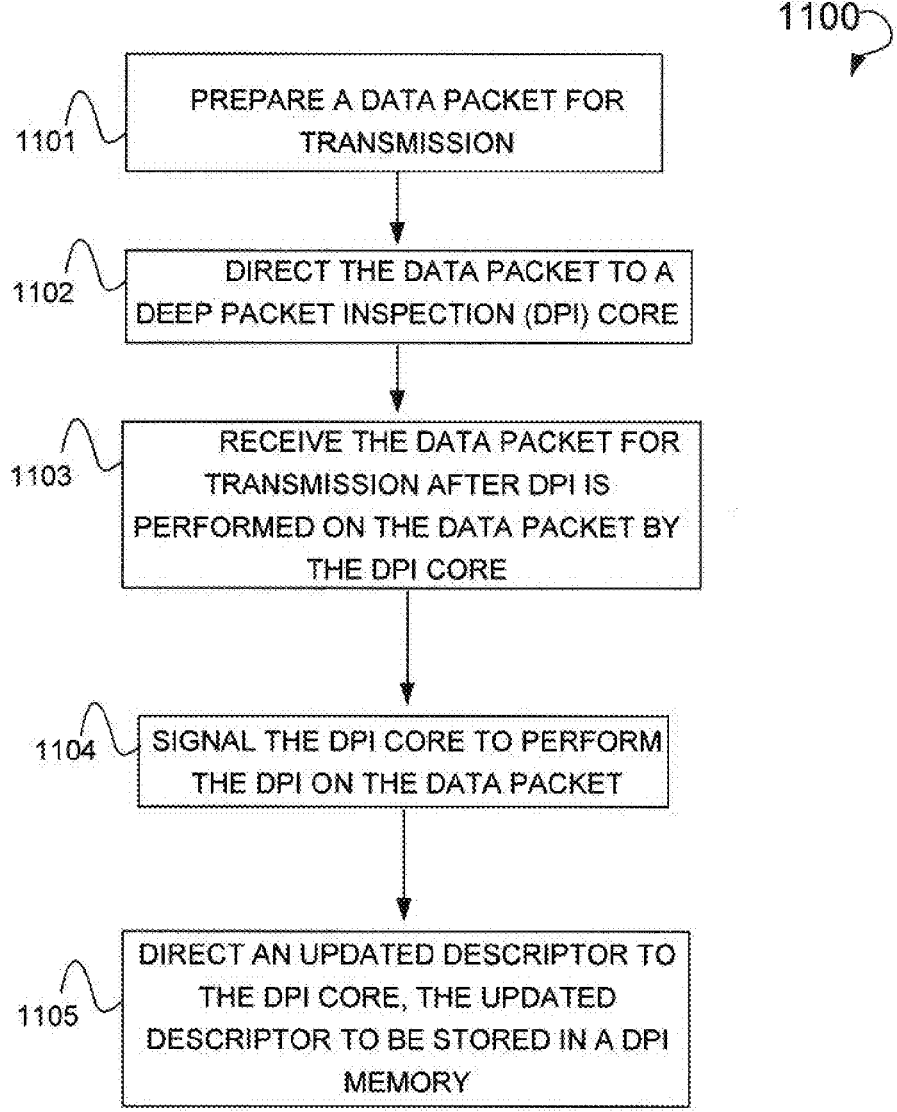
FIG. 11 is a diagram of a computer implemented method, according to an example embodiment, executed to perform DPI on a data packet to be transmitted.

FIG. 11 is a diagram of an example computer implemented method 1400 executed to perform DPI on a data packet to be transmitted. The operations of the method 1100 may be implemented by, for example, a compute blade 102. Shown is an operation 1101 that is executed by the core 801 to prepare a data packet for transmission. Operation 1102 is executed by the memory controller 802 to direct the data packet to a DPI core 803. Operation 1103 is executed by the NIC 804 to receive the data packet for transmission after DPI is performed on the data packet by the DPI core 803. In some example embodiments, the memory controller 802 includes an interface only accessible by the DPI core 803. Operation 1104 is executed by the interrupt controller 805 to signal the DPI core to perform the DPI on the data packet. In some example embodiments, the interrupt controller 805 includes an interface only accessible by the DPI core. Operation 1105 is executed by the I/O MMU 806 to direct an updated descriptor to the DPI core 803, the updated descriptor to be stored in a DPI memory.

Figure 12:
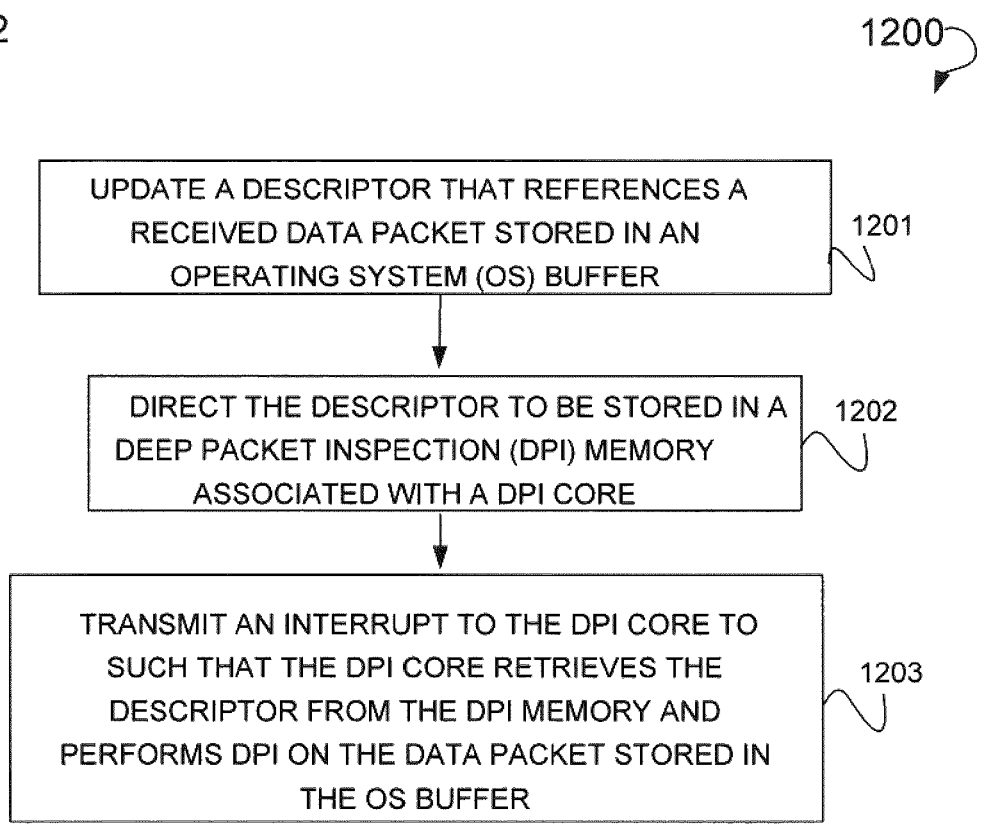
FIG. 12 is a diagram of a computer implemented method, according to an example embodiment, executed to perform DPI on a received data packet.

FIG. 12 is a diagram of an example computer implemented method 1200 executed to perform DPI on a received data packet. The operations of the method 1200 may be implemented by, for example, a compute blade 102. Shown is an operation 1201 that is executed by the DMA module 901 to update a descriptor that references a received data packet stored in an OS buffer. Operation 1202 is executed by the I/O MMU 903 to direct the descriptor to be stored in a DPI memory associated with a DPI core 904. Operation 1203 is executed by the interrupt controller 905 to transmit an interrupt to the DPI core 904 to such that the DPI core 904 retrieves the descriptor from the DPI memory and performs DPI on the data packet stored in the OS buffer. In some example embodiments, the I/O MMU 903 includes an interface only accessible by the DPI core 904. In some example embodiments, the interrupt controller 905 includes an interface only accessible by the DPI core 904. In some example embodiments, the DMA module 901 copies the data packet to OS buffer.

Figure 13:
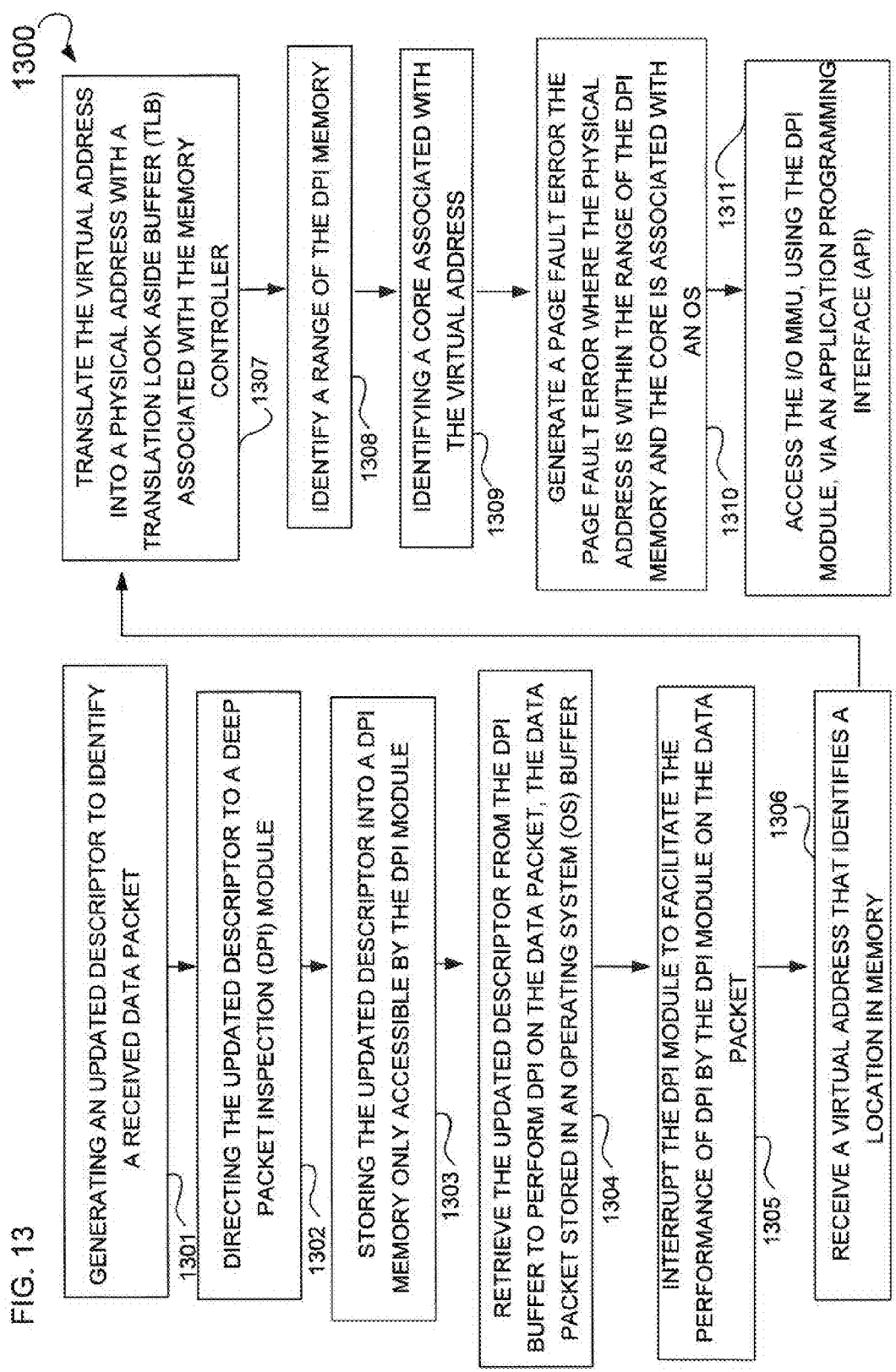
FIG. 13 is a diagram of a computer implemented method, according to an example embodiment, executed to perform DPI on a data packet to be transmitted.

FIG. 13 is a diagram of an example computer implemented method 1300 executed to perform DPI on a data packet to be transmitted. The operations of the method 1300 may be implemented by, for example, a compute blade 102. Shown is an operation 1301 that is executed by the DMA module 1001 to generate an updated descriptor to identify a received data packet. Operation 1302 is executed by the I/O MMU 1003 to direct the updated descriptor to the DPI module 1004. Operation 1303 is executed by the DPI module 1004 to store the updated descriptor into a DPI memory only accessible by the DPI module 1004. Operation 1304 is executed by the DPI module 1004 to retrieve the updated descriptor from the DPI buffer to perform DPI on the data packet, the data packet stored in an OS buffer. In some example embodiments, the updated descriptor includes a pointer to an address in the OS buffer. In some example embodiments, the DPI includes a determination of at least one of a QoS for the data packet, a network traffic and bandwidth consideration, to detect malware associated with the data packet, or to enforce business conduct policies with regard to the data packet. Operation 1305 is executed by the interrupt controller 1006 to interrupt the DPI module to facilitate the performance of DPI by the DPI module on the data packet. In some example embodiments, the performance of DPI on the data packet includes inspecting a load of the data packet. Operation 1306 is executed by the memory controller 1007 to receive a virtual address to identify a location in memory. Operation 1307 is executed by the memory controller 1007 to translate the virtual address into a physical address with a TLB associated with the memory controller 1007. Operation 1308 is executed by the memory controller 1007 to identify a range of DPI memory associated with the DPI module, the DPI memory physically distinct from memory associated with the OS buffer 1006. Operation 1309 is executed by the memory controller 1007 to identify a core associated with the virtual address. Operation 1310 is executed by the memory controller 1007 to generate a page fault error, the page fault error generated where the physical address is within the range of DPI memory and the core is associated with the OS 1003. Operation 1311 is executed by the DPI module 1004 to access the I/O MMU 1003 via an API.

In some example embodiments, wherein the performance of DPI includes an inspection for at least one of a QoS for the data packet, to meet network traffic and bandwidth considerations, to detect malware associated with the data packet, or enforce business conduct policies with regard to the data packet. Further, the descriptor includes at least one of a pointer to an address in memory, or a referent to the address in the memory. Additionally, the DPI module resides on a common compute blade with the OS. Moreover, the OS is executed on a core that is distinct from an additional core upon which the DPI module is executed. In some example embodiments, the performance of DPI on the data packet includes inspecting a load of the data packet.

Figure 14:
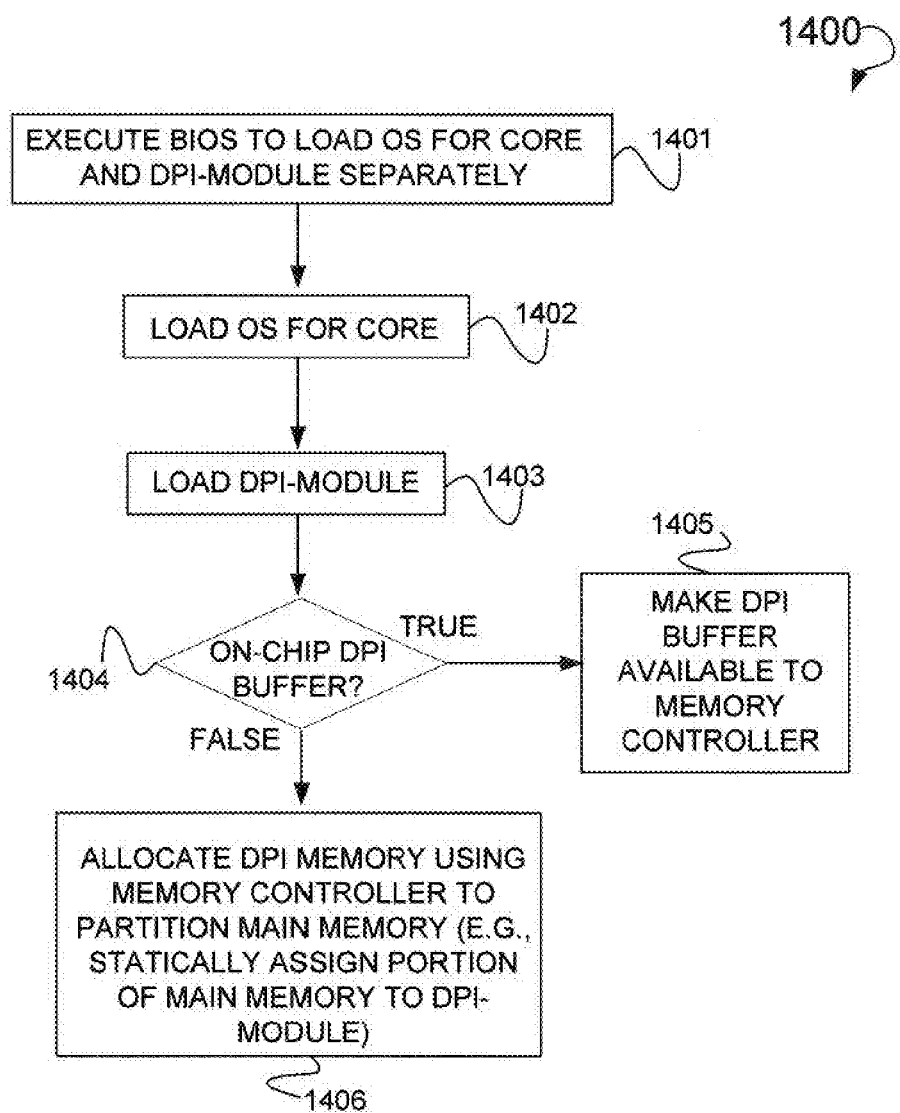
FIG. 14 is a flowchart illustrating a method, according to an example embodiment, to load Basic Input/Output System (BIOS) for execution on the compute blade so as to maintain isolation between a core and DPI-core.

FIG. 14 is a flowchart illustrating an example method 1400 to load BIOS, for execution on the compute blade 102, so as to maintain isolation between a core and DPI-core. Illustrated is an operation 1401 that is executed to separately load the OS 301 for the core 201, and the DPI-module 302 for the DPI-core 202. An operation 1402 is executed to load the OS 301 for the core 201. An operation 1403 is executed to load the DPI-module 302 for the DPI-core 202. A decisional operation 1404 is shown that determines whether an on-chip DPI buffer 215 is to be implemented. Where the decisional operation 1404 evaluates to "true", an operation 1405 is executed. Where decisional operation 1404 evaluates to "false" an operation 1406 is executed. Operation 1405, when executed, makes the DPI buffer 215 available to the memory controller 216. Operation 1406 is executed to allocate memory using the memory controller 216 to allocate DPI memory within the main memory 203. This memory may be the OS packet buffer 205 and the DPI memory 206.

Figure 15:
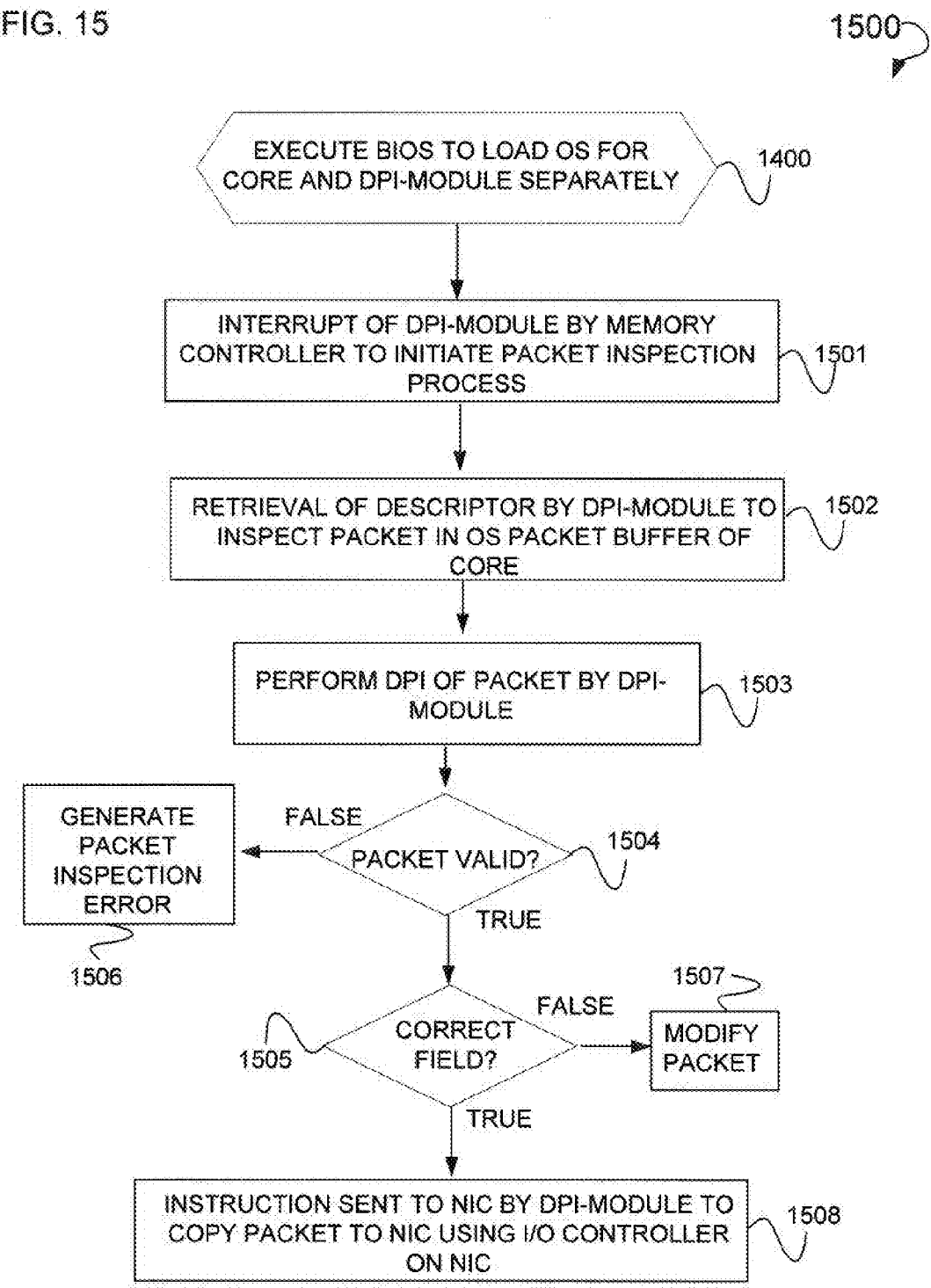
FIG. 15 is a flowchart illustrating a method, according to an example embodiment, is used to transmit a data packet inspected using DPI.

FIG. 15 is a flowchart illustrating an example method 1500 is used to transmit a data packet inspected using DPI. Shown is a preliminary operation in the form of the method 1400. An operation 1501 is executed by the memory controller 216 to interrupt the DPI-module 302 to initiate the DPI process. An operation 1502 is executed by the DPI-core 202 to retrieve a descriptor (e.g., a pointer) to allow the DPI-module 302 to inspect the data packet in the OS packet buffer 205. An operation 1503 is executed by the DPI-core 202 to perform a DPI of the data packet in the OS packet buffer 205. This inspection is performed by the DPI-module 302. Decisional operation 1504 is executed by DPI-core 202 to determine whether the packet is valid. Validity as, defined herein, may include QoS considerations, network traffic and bandwidth considerations, malware considerations, or business conduct and policy considerations. In cases where decisional operation 1804 violates to "false", an operation 1506 is executed. In cases where decisional operation 1504 evaluates to "true", a decisional operation 1505 is executed. Operation 1506 is executed by the DPI-core 202 to generate a packet inspection error (e.g., an exception is thrown). Decisional operation 1505 is executed to determine whether the header field or load of a packet is correct, or whether the field or load needs to be modified. Correct, as used herein, means that the header field or load does or does not need to be changed due to due to issues regarding data integrity, readability or other suitable issues. Modified, as used herein, includes using asymmetric or symmetric encryption, or hashing to obscure or un-obscure the data packet. In cases where decisional operation 1505 evaluates to "true", operation 1508 is executed. In cases where decisional operation 1505 evaluates to "false", operation 1507 is executed. Operation 1507 modifies the data packet (e.g., encrypts, decrypts, hashes or de-hashes the data packet). Operation 1508 is executed by the DPI-core 202 generate instruction to be sent to the NIC 204 to copy the data packet using an I/O controller associated with the NIC 204.

FIG. 16 is a flowchart illustrating an example method 1600 used to receive a data packet and to perform DPI on the data packet. Illustrated is a preliminary operation in the form of method 1400. An operation 1601 is illustrated that is executed by the NIC 204 to receive the data packet 401. An operation 1602 is executed by the NIC 204 to write the data packet 401 to the OS packet buffer 205. This write operation may be performed using the DMA module 207. An operation 1603 is executed by the I/O MMU 219 to provide notice to the DPI-module 302 that the data packet 401 is ready for inspection. Further, through the execution of operation 1603 the updated descriptor is written to the DPI memory 206 or DPI buffer 215 (see FIGS. 6 and 7). Notice, as used herein, may be a boolean flag, bit value, or other suitable type of signal that the updated descriptor can be used to access the received data packet. This descriptor may be generated by the DMA module 207, or the OS 301. An operation 1604 is executed by the interrupt controller 211 to interrupt the DPI-module 302. This interrupt may be provided by the DMA module 207 or the interrupt controller 211 to the DPI-core 202. An operation 1605 is executed by DPI-core 202 to perform DPI on the data packet 401 written to the OS packet buffer 205. A decisional operation 1606 is executed by the DPI-core 202 to determine whether a packet is valid. Validity, as used herein, may include QoS considerations, network traffic and bandwidth considerations, malware considerations, network traffic and bandwidth utilization considerations, or business policy and conduct considerations. In cases where decisional operation 1606 evaluates to "false", an operation 1607 is executed. In cases where decisional operation 1606 evaluates to "true", the operation 1608 is executed. Operation 1608 is executed by the DPI-core 202. Operation 1608 is executed to copy the descriptor to the OS 301 to allow the OS 301 to access the data packet stored in the OS packet buffer 205. Operation 1607 is executed to generate a packet inspection error (e.g., an exception is thrown). Operation 1609 is executed by the interrupt controller 211 to interrupt the OS 301 to allow the OS 301 to process the data packet 401 stored in the OS packet buffer 205.

FIG. 17 is a flowchart illustrating an example method 1700 used to denote a page fault error in accessing DPI memory. This method 1700 may be executed by the memory controller 216. DPI memory may be the DPI memory 206, or the DPI buffer 215. Shown is a virtual address 1701 that is used in the indexing of a TLB to retrieve a physical address corresponding to the virtual address 1701. This indexing is illustrated through the execution of operation 1702. Decisional operation 1703 is executed to determine whether the physical address corresponding to the virtual address 1701 is within the memory range of the DPI memory. In cases where decisional operation 1703 evaluates to "true", the decisional operation 1705 is executed. In cases where decisional operation 1703 evaluates to "false", a termination condition 1707 is executed. Decisional operation 1705 is executed to determine whether the appropriate core is attempting to access DPI memory, where a core identifier 1704 is received. This core may be the core 201, or the DPI-core 202. In cases where decisional operation 1705 evaluates to "false", the page fault 1706 is generated. In cases where decisional operation 1705 evaluates to "true", a termination condition 1707 is executed.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

The methods shown herein may be implemented as data and instructions that are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural, nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:
   a core to prepare a data packet for transmission;
   a memory controller to direct the data packet to a Deep Packet Inspection (DPI) core, wherein the memory controller includes an interface only accessible by the DPI core; and
   a Network Interface Card (NIC) to receive the data packet for transmission after DPI is performed on the data packet by the DPI core.

2. The computer system of claim 1, further comprising an interrupt controller to signal the DPI core to perform the DPI on the data packet.

3. The computer system of claim 2, wherein the interrupt controller includes an interface only accessible by the DPI core.

4. The computer system of claim 1, further comprising an Input/Output Memory Management Unit (I/O MMU) to direct an updated descriptor to the DPI core, the updated descriptor to be stored in a DPI memory.

5. The computer system of claim 1, wherein the core, the memory controller, and the NIC reside on a common compute blade.

6. A computer system comprising:
   a Direct Memory Management (DMA) module, associated with a Network Interface Card (NIC), to update a descriptor that references a received data packet stored in an Operating System (OS) buffer;
   an Input/Output Memory Management Unit (I/O MMU) to direct the descriptor to be stored in a Deep Packet Inspection (DPI) memory associated with a DPI core, wherein the I/O MMU includes an interface only accessible by the DPI core; and
   an interrupt controller to transmit an interrupt to the DPI core to such that the DPI core retrieves the descriptor from the DPI memory and performs DPI on the data packet stored in the OS buffer.

7. The computer system implemented method of claim 6, wherein the interrupt controller includes an interface only accessible by the DPI core.

8. The computer system implemented method of claim 6, wherein the DMA module copies the data packet to OS buffer.

9. The computer system of claim 6, wherein the DMA module, the I/O MMU, and the interrupt controller reside on a common compute blade.

10. A computer implemented method comprising:
    generating an updated descriptor, using a Direct Memory Management (DMA) module associated with a Network Interface Card (NIC), to identify a received data packet;
    directing the updated descriptor, using an Input/Output Memory Management Unit (I/O MMU), to a Deep Packet Inspection (DPI) module; and
    storing the updated descriptor, using the DPI module, into a DPI memory only accessible by the DPI module.

11. The computer implemented method of claim 10, further comprising retrieving the updated descriptor, using the DPI module, from the DPI buffer to perform DPI on the data packet, the data packet stored in an Operating System (OS) buffer.

12. The computer implemented method of claim 11, wherein the updated descriptor includes a pointer to an address in the OS buffer.

13. The computer implemented method of claim 11, wherein the DPI includes a determination of at least one of a QoS for the data packet, a network traffic and bandwidth consideration, to detect malware associated with the data packet, or to enforce business conduct policies with regard to the data packet.

14. The computer implemented method of claim 10, further comprising interrupting the DPI module, using an interrupt controller, to facilitate the performance of DPI by the DPI module on the data packet.

15. The computer implemented method of claim 10, wherein the performance of DPI on the data packet includes inspecting a load of the data packet.

16. The computer implemented method of claim 10, further comprising:
   receiving a virtual address, using a memory controller, that identifies a location in memory;
   translating, using the memory controller, the virtual address into a physical address with a Translation Look Aside Buffer (TLB) associated with the memory controller;
   identifying, using the memory controller, a range of the DPI memory; and
   identifying, using the memory controller, a core associated with the virtual address; and
   generating a page fault error, using the memory controller, the page fault error generated where the physical address is within the range of the DPI memory and the core is associated with an OS.

17. The computer implemented method of claim 10, further comprising accessing the I/O MMU, using the DPI module, via an Application Programming Interface (API).

* * * * *

UNITED STATES PATENT AND TRADEMARK OFFICE
CERTIFICATE OF CORRECTION

PATENT NO. : 8,122,125 B2
APPLICATION NO. : 12/555552
DATED : February 21, 2012
INVENTOR(S) : Matteo Monchiero et al.

It is certified that error appears in the above-identified patent and that said Letters Patent is hereby corrected as shown below:

In the Claims:

In column 10, line 36, in Claim 7, delete "implemented method of" and insert -- of --, therefor.

In column 10, line 39, in Claim 8, delete "implemented method of" and insert -- of --, therefor.

In column 10, line 61, in Claim 13, delete "11," and insert -- claim 11, --, therefor.

Signed and Sealed this
Twenty-eighth Day of May, 2013

Teresa Stanek Rea
*Acting Director of the United States Patent and Trademark Office*